US012659233B2

(12) United States Patent
Pandey et al.

(10) Patent No.: US 12,659,233 B2
(45) Date of Patent: \*Jun. 16, 2026

(54) AUTOMATICALLY CONFIGURING NETWORK ELEMENTS IN MULTI-VENDOR AND MULTI-DOMAIN TOPOLOGIES

(71) Applicants: AT&T Intellectual Property I, L.P., Atlanta, GA (US); AT&T Communications Services India Private Limited, Bangalore (IN); AT&T Global Network Services (UK) B.V., The Hague (NL)

(72) Inventors: Mritunjay Pandey, Bangalore (IN); Subhash Kapoor, Wall, NJ (US); Carl Thomas, Southsea (GB); Somnath Mallick, West Bengal (IN); Lalena Aria, Middletown, NJ (US); Donald Charles Jeffery, Matawan, NJ (US); Saurav Paira, Kendall Park, NJ (US)

(73) Assignees: AT&T Intellectual Property I, L.P., Atlanta, GA (US); AT&T Communication Services India Private Limited, Bangalore (IN); AT&T Global Network Services (UK)B.V., The Hague (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,173

(22) Filed: Jun. 10, 2024

(65) Prior Publication Data

US 2024/0333595 A1 Oct. 3, 2024

Related U.S. Application Data

(63) Continuation of application No. 18/065,324, filed on Dec. 13, 2022, now Pat. No. 12,009,983.

(51) Int. Cl.
| | |
|---|---|
| *H04L 41/0895* | (2022.01) |
| *H04L 41/0823* | (2022.01) |
| *H04L 41/12* | (2022.01) |

(52) U.S. Cl.
CPC ...... *H04L 41/0895* (2022.05); *H04L 41/0823* (2013.01); *H04L 41/12* (2013.01)

(58) Field of Classification Search
CPC .. H04L 41/0895; H04L 41/0823; H04L 41/12
(Continued)

(56) References Cited

U.S. PATENT DOCUMENTS

| | | | | | |
|---|---|---|---|---|---|
| 7,017,151 | B1 * | 3/2006 | Lopez | ..................... | G06F 8/656 |
| | | | | | 717/125 |
| 11,128,556 | B2 * | 9/2021 | Prasad | ................ | G06F 9/45558 |

(Continued)

*Primary Examiner* — Liang Che A Wang

(57) ABSTRACT

Devices, computer-readable media, and methods for automatically configuring network elements in multi-vendor and multi-domain topologies. In one example, a method includes determining a need of a communications network, where a topology of the communications network includes a plurality of network functions from at least two different vendors, predicting a subset of the plurality of network functions and respective configuration parameter values for network functions in the subset, that are expected to support the need of the communications network, and modifying the configurations of the network functions in the subset to reflect the respective configuration parameter values.

20 Claims, 4 Drawing Sheets

(58) Field of Classification Search
USPC ......................................... 709/220, 221, 223
See application file for complete search history.

(56) References Cited

U.S. PATENT DOCUMENTS

| | | | |
|---|---|---|---|
| 11,706,154 B2 * | 7/2023 | Parikh | H04L 43/20 |
| | | | 709/226 |
| 2004/0059813 A1 * | 3/2004 | Bolder | H04L 41/0806 |
| | | | 709/224 |
| 2020/0052991 A1 * | 2/2020 | Kodaypak | H04L 47/2416 |
| 2021/0256318 A1 * | 8/2021 | Iyer | G06F 18/22 |
| 2021/0410017 A1 * | 12/2021 | Caswell | H04W 16/18 |
| 2022/0046752 A1 * | 2/2022 | Lee | H04W 76/40 |
| 2022/0182464 A1 * | 6/2022 | Dickens | H04L 41/5051 |
| 2022/0303206 A1 * | 9/2022 | Saxena | H04L 43/062 |
| 2022/0360494 A1 * | 11/2022 | Chunduru Venkata | |
| | | | H04L 67/51 |

* cited by examiner

200

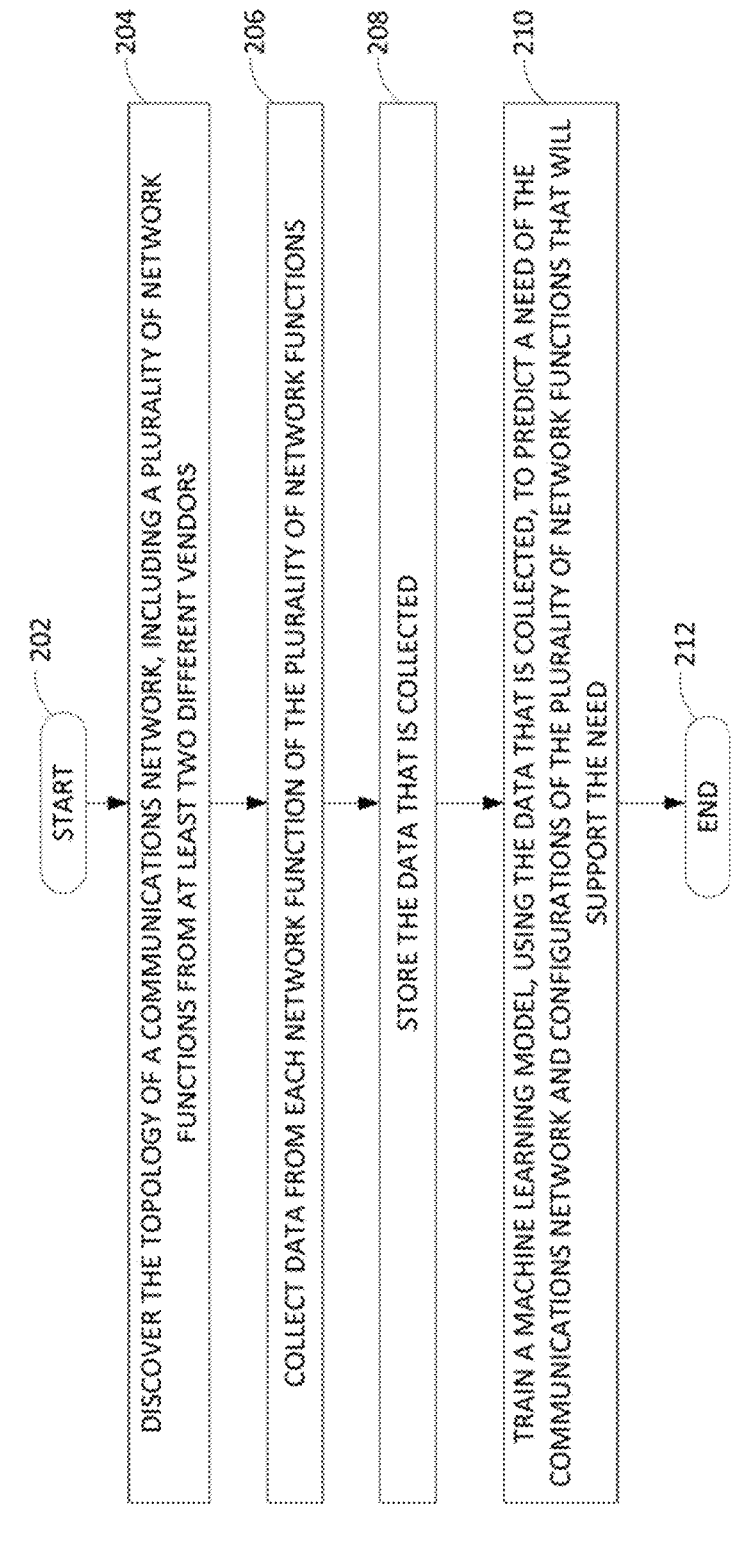

START
202

DISCOVER THE TOPOLOGY OF A COMMUNICATIONS NETWORK, INCLUDING A PLURALITY OF NETWORK FUNCTIONS FROM AT LEAST TWO DIFFERENT VENDORS
204

COLLECT DATA FROM EACH NETWORK FUNCTION OF THE PLURALITY OF NETWORK FUNCTIONS
206

STORE THE DATA THAT IS COLLECTED
208

TRAIN A MACHINE LEARNING MODEL, USING THE DATA THAT IS COLLECTED, TO PREDICT A NEED OF THE COMMUNICATIONS NETWORK AND CONFIGURATIONS OF THE PLURALITY OF NETWORK FUNCTIONS THAT WILL SUPPORT THE NEED
210

END
212

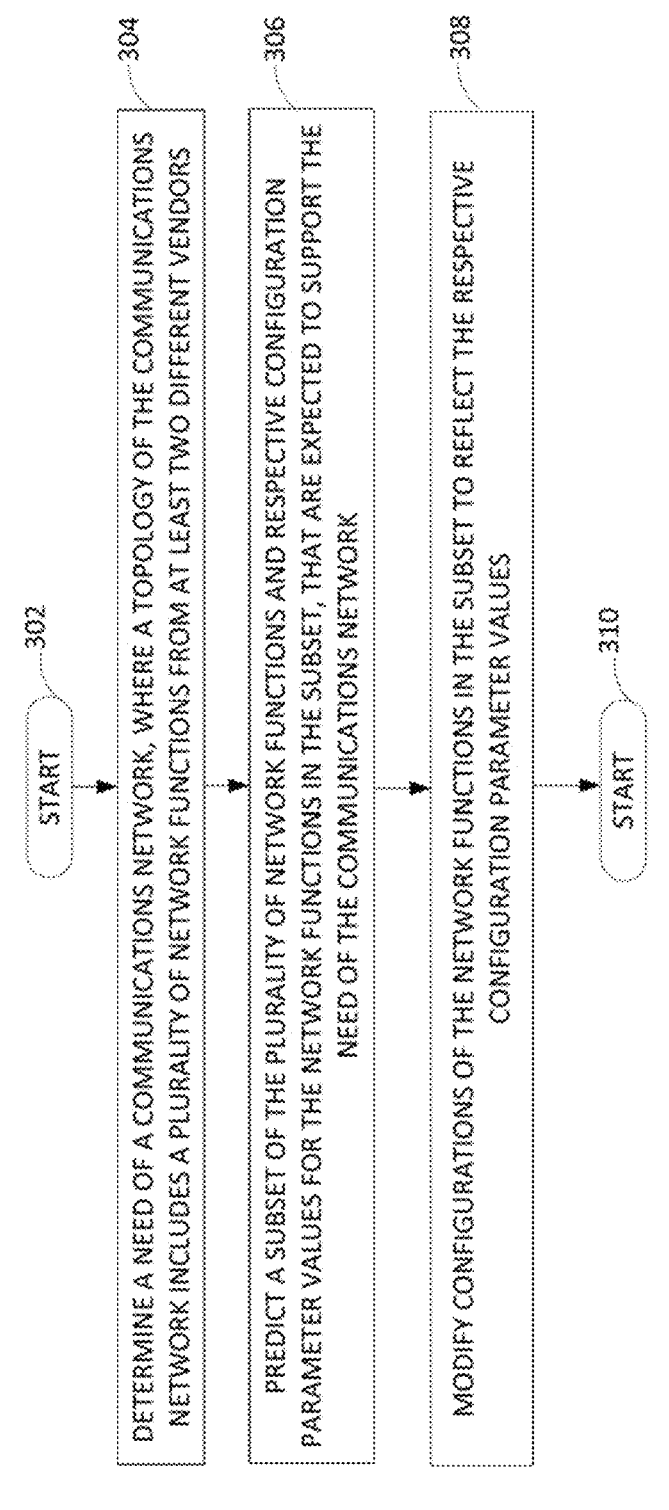

START — 302

DETERMINE A NEED OF A COMMUNICATIONS NETWORK, WHERE A TOPOLOGY OF THE COMMUNICATIONS NETWORK INCLUDES A PLURALITY OF NETWORK FUNCTIONS FROM AT LEAST TWO DIFFERENT VENDORS — 304

PREDICT A SUBSET OF THE PLURALITY OF NETWORK FUNCTIONS AND RESPECTIVE CONFIGURATION PARAMETER VALUES FOR THE NETWORK FUNCTIONS IN THE SUBSET, THAT ARE EXPECTED TO SUPPORT THE NEED OF THE COMMUNICATIONS NETWORK — 306

MODIFY CONFIGURATIONS OF THE NETWORK FUNCTIONS IN THE SUBSET TO REFLECT THE RESPECTIVE CONFIGURATION PARAMETER VALUES — 308

START — 310

FIG. 3

AUTOMATICALLY CONFIGURING NETWORK ELEMENTS IN MULTI-VENDOR AND MULTI-DOMAIN TOPOLOGIES

This application is a continuation of U.S. patent application Ser. No. 18/065,324, filed on Dec. 13, 2022, now U.S. Pat. No. 12,009,983; which is herein incorporated by reference in its entirety.

The present disclosure relates generally to autonomic computing and relates more particularly to devices, non-transitory computer-readable media, and methods for automatically configuring network elements in multi-vendor and multi-domain topologies.

BACKGROUND

A multi-vendor communications network is a network that supports tools from two or more vendors (e.g., manufacturers or providers). For instance, different applications and different platforms may be implemented in a communications network to solve different problems and support different user needs. Similarly, a multi-domain network is a coordinated network composed of two or more interconnected domains. For instance, an enterprise that spans multiple different geographic locations, departments, or business functions may implement a plurality of different domains for the different geographic locations, departments, or business functions.

SUMMARY

In one example, the present disclosure describes devices, computer-readable media, and methods for automatically configuring network elements in multi-vendor and multi-domain topologies. For instance, in one example, a method includes determining a need of a communications network, where a topology of the communications network includes a plurality of network functions from at least two different vendors, predicting a subset of the plurality of network functions and respective configuration parameter values for network functions in the subset, that are expected to support the need of the communications network, and modifying the configurations of the network functions in the subset to reflect the respective configuration parameter values.

In another example, a non-transitory computer-readable medium stores instructions which, when executed by a processing system including at least one processor, cause the processing system to perform operations. The operations include determining a need of a communications network, where a topology of the communications network includes a plurality of network functions from at least two different vendors, predicting a subset of the plurality of network functions and respective configuration parameter values for network functions in the subset, that are expected to support the need of the communications network, and modifying the configurations of the network functions in the subset to reflect the respective configuration parameter values.

In another example, a system includes a processing system including at least one processor and a computer-readable medium storing instructions which, when executed by the processing system, cause the processing system to perform operations. The operations include determining a need of a communications network, where a topology of the communications network includes a plurality of network functions from at least two different vendors, predicting a subset of the plurality of network functions and respective configuration parameter values for network functions in the subset, that are expected to support the need of the communications network, and modifying the configurations of the network functions in the subset to reflect the respective configuration parameter values.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for automatically configuring network elements in multi-vendor and multi-domain topologies, in accordance with the present disclosure;

FIG. 3 illustrates a flowchart of an example method for automatically configuring network elements in multi-vendor and multi-domain topologies, in accordance with the present disclosure.

To facilitate understanding, identical reference numerals have been used, where possible, to designate identical elements that are common to the figures.

DETAILED DESCRIPTION

Figure 1:
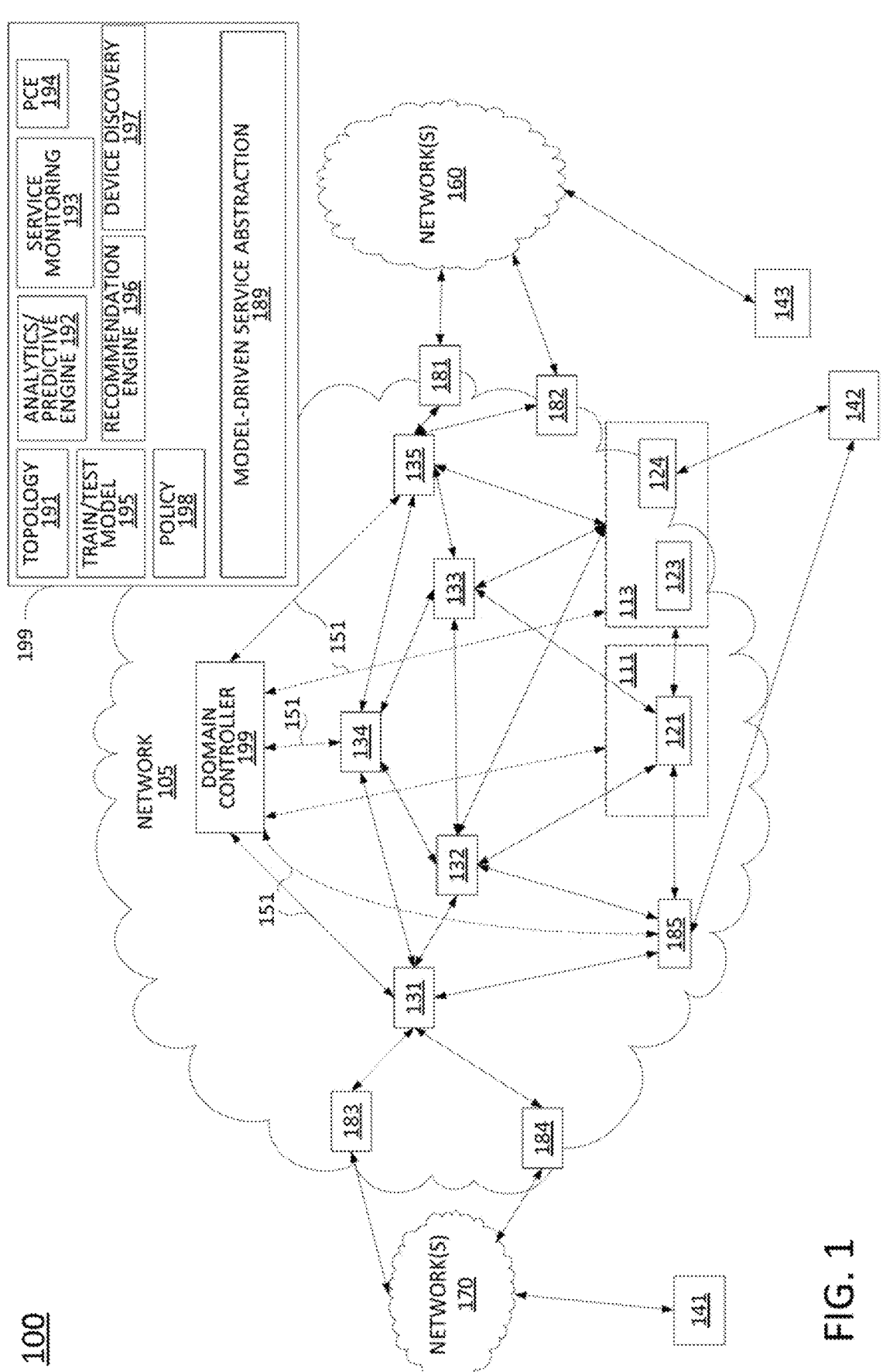
FIG. 1 illustrates a block diagram depicting one example of a communications network or system for performing or enabling the steps, functions, operations, and/or features described herein.

Examples of the present disclosure describe devices, non-transitory computer-readable media, and methods for automatically configuring network elements in multi-vendor and multi-domain topologies. As discussed above, a multi-vendor communications network is a network that supports tools from two or more vendors (e.g., manufacturers or providers). For instance, different applications and different platforms may be implemented in a communications network to solve different problems and support different user needs. Similarly, a multi-domain network is a coordinated network composed of two or more interconnected domains. For instance, an enterprise that spans multiple different geographic locations, departments, or business functions may implement a plurality of different domains for the different geographic locations, departments, or business functions.

Multi-vendor and/or multi-domain network topologies provide many advantages, such as the ability to deploy different applications and platforms to support different user needs and the ability to coordinate operations across different geographic locations, departments, and business functions. However, configuring the devices within the network, including the virtual network functions (VNFs), physical network functions (PNFs), and cloud-native network functions (CNFs), to optimize network performance and user experience is a complex process. For instance, devices from different vendors may utilize different proprietary data models and schema definitions. Moreover, even devices from the same vendor may include different configurable features depending on device family, series, and type. Moreover, different domains (as Layer 0, Layer 1, Layer 2, and Layer 3) may vary depending upon containment hierarchy. Thus, a runtime configuration that results in optimized performance for one device or domain may not necessarily yield the same result when applied to a different device or domain. Moreover, different interface protocols may be needed to download configuration data to different devices. Across a large network, it becomes a complex and time consuming task to learn the optimal runtime configurations for every device that enable the devices to work together to support the user experience.

Examples of the present disclosure provide a domain controller that uses machine learning to learn the optimal runtime configurations (i.e., parameter settings and interface characteristics) for all network functions (VNFs, PNFs, and CNFs) within a multi-vendor and/or multi-domain network. The domain controller may build a database of the network functions and their physical and virtual characteristics, which may be further analyzed to predict future resource needs of the network as well as devices and vendors that are compatible with those resource needs. Optimal runtime configurations may be applied automatically to the relevant network functions. Thus, examples of the present disclosure simplify the configuration of multi-vendor and/or multi-domain network topologies.

Moreover, examples of the present disclosure enable such network topologies to more easily adapt to changing demands on the network, such as sudden, temporary surges in network traffic due to holidays, special events, natural disasters, emergencies, and the like. In such cases, additional network functions can be deployed in the network on-the-fly, with the optimal configurations already applied. Added network functions can be decommissioned when no longer needed to support the demands on the network. These and other aspects of the present disclosure are described in greater detail below in connection with the examples of FIGS. 1-4.

Within the context of the present disclosure, a "virtual network function" or "VNF" is understood to refer to a virtualized network service running on an open computing platform (where the network service may, in the past, have been performed by dedicated and/or proprietary hardware devices). A "physical network function" or "PNF" is understood to refer to a purpose-built hardware device that provides specific networking functions (e.g., a router, a switch, a firewall, a load balancer, or the like). A "cloud-native network function" or "CNF" is understood to refer to a software implementation of a network function that is traditionally performed by a physical, purpose-build hardware device (e.g., a PNF), but which runs inside Linux containers. According to some network standards, CNFs may be particular types of VNFs.

To aid in understanding the present disclosure, FIG. 1 illustrates a block diagram depicting one example of a communications network or system 100 for performing or enabling the steps, functions, operations, and/or features described herein. The system 100 may include any number of interconnected networks or domains which may use the same or different communication technologies. As illustrated in FIG. 1, system 100 may include a network 105, e.g., a core communication network (e.g., a telecommunication network). In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, a 5G core network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) and/or containers comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each comprise a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one particular example, networks 160 and 170 may comprise 5G radio access networks. For example, as illustrated in FIG. 1, the system 100 may represent a "non-stand alone" (NSA) mode architecture where 5G radio access network components, such as a "new radio" (NR), "gNodeB" (or "gNB"), and so forth are supported by a 4G/LTE core network (e.g., where network 105 represents an Evolved Packet Core (EPC) network). However, in another example, system 100 may instead comprise a 5G "standalone" (SA) mode point-to-point or service-based architecture where EPC components and functions of network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. In addition, these various components may comprise VNFs, as described herein.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. User devices 141-143 may comprise, for example, cellular telephones, smart phones, personal computers, wearable devices, augmented reality/virtual reality devices (e.g., headsets), other wireless and wired computing devices, private branch exchanges, customer edge (CE) routers, media terminal adapters, cable boxes, home gateways and/or routers, and so forth.

In accordance with the present disclosure, user devices 141-143 may communicate with or may communicate via network 105 in various ways. For example, user device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs), physical network functions (PNFs), and cloud-native network functions (CNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. These various network functions may include container-based VNFs and/or VM-based VNFs. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a streaming server, a domain name service (DNS) server, a packet data network gateway (PGW), a gateway mobile switching center (GMSC), a short message service center (SMSC), etc.

Figure 4:
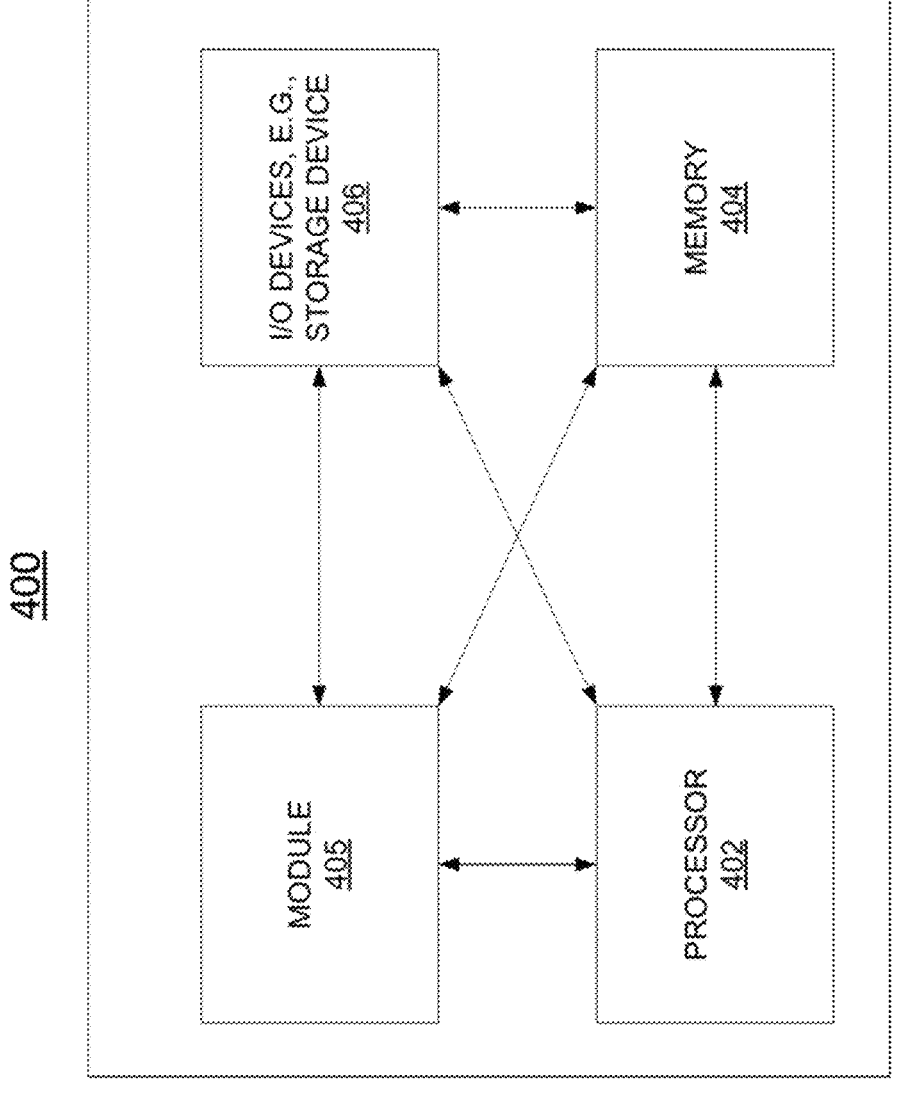
FIG. 4 illustrates a high level block diagram of a computing device specifically programmed to perform the steps, functions, blocks and/or operations described herein.

As further illustrated in FIG. 1, network 105 includes a domain controller 199 (including several components as described in greater detail below). In one example, the domain controller 199 may comprise a computing system or server, such as computing system 400 depicted in FIG. 4, and may be configured to provide one or more operations or functions in connection with examples of the present disclosure for automatically configuring network elements in multi-vendor and multi-domain topologies. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 4 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the domain controller 199. For instance, in one example, the domain controller 199 is responsible for such functions as provisioning and releasing instantiations of VNFs, PNFs, and/or CNFs (which may originate with multiple different vendors) to perform the functions of routers, switches, and other devices, provisioning routing tables and other operating parameters for the VNFs, and so forth. In one example, the domain controller 199 may maintain communications with VNFs, PNFs, and/or CNFs and/or host devices/NFVI via a number of control links 151 which may comprise secure tunnels for signaling communications over an underling IP infrastructure of network 105. In other words, the control links 151 may comprise virtual links multiplexed with transmission traffic and other data traversing network 105 and carried over a shared set of physical links. For ease of illustration control links associated with some of the components of network 105 are omitted from FIG. 1. In one example, the domain controller 199 may also comprise a virtual machine operating on NFVI/host device(s), or may comprise a dedicated device. For instance, the domain controller 199 may be collocated with one or more VNFs, PNFs, and/or CNFs or may be deployed in a different host device or at a different physical location.

The functions of the domain controller 199 are embodied in a plurality of components 191-198 and may include, for example, topology discovery 191 (e.g., discovering the topology of the network 105), analytics and prediction engine 192 (e.g., predicting a need of the network and/or configuration parameter values of VNFs, PNFs, and/or CNFs to support a predicted network need), service monitoring 193 (e.g., monitoring demand on services supported by VNFs, PNFs, and/or CNFs), path computation engine (PCE) 194 (e.g., determining paths between VNFs, PNFs, and CMFs), a training and testing model service 195 (e.g., to train and deploy a machine learning model to predict a need of the network and/or configuration parameter values of VNFs, PNFs, and/or CNFs to support a predicted network need), a recommendation engine 196 (e.g., to recommend modifications to configuration parameter values for VNFs, PNFs, and/or CNFs to support predicted network needs), device discovery 197 (e.g., to discover VNFs, PNFs, and/or CNFs in the network 105), and policy management 198 (e.g., to ensure that modifications to configuration parameter values are consistent with network policies). The domain controller 199 may further include a model-driven service abstraction layer 189 that may include various logical functional layers (e.g., a device layer, a network layer, a service layer, etc.).

The functions of domain controller 199 may include collecting data from the network 105 (e.g., topology, including VNFs, PNFs, CNFs, and routes therebetween) and using the data to train a machine learning model that can predict needs of the network 105 (e.g., temporary drops or spikes in network traffic). The machine learning model may also be trained to predict optimal arrangements or VNFs, PNFs, and CNFs and corresponding values for configuration parameters of the VNFs, PNFs, and CNFs to support predicted network needs.

For instance, the functions of the domain controller 199 may include the selection of NFVI from among various NFVI available in network 105 (e.g., NFVI 111 or 113) to host various devices, such as routers, gateways, switches, etc., and the instantiation of such devices. For example, with respect to units 123 and 124, the domain controller 199 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a streaming server, a DNS server, a PGW, a GMSC, a SMSC, a CCE, and so forth. In one example, the domain controller 199 may download the configuration code to the NFVI 113. In another example, the domain controller 199 may instruct the NFVI 113 to load the configuration code previously stored on NFVI 113 and/or to retrieve the configuration code from another device in network 105 that may store the configuration code for one or more VNFs, PNFs, and/or CNFs. The functions of the domain controller 199 may also include releasing or decommissioning unit 123 and/or unit 124 when no longer required, the transferring of the functions of units 123 and/or 124 to different NFVI, e.g., when NVFI 113 is taken offline, and so on.

In addition, in one example, the domain controller 199 may represent a processing system comprising a plurality of controllers, e.g., a multi-layer software defined networking (SDN) controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs, PNFs, and/or CNFs (e.g., a network switch, a layer 3 switch and/or a router, etc.). In addition, these various components may be co-located or distributed among a plurality of different dedicated computing devices or shared computing devices (e.g., NFVI) as described herein.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs, PNFs, and/or CNFs hosted by and operating on additional NFVIs. For instance, as illustrated in FIG. 1, internal nodes 131 and 135 may comprise VNFs, PNFs, and/or CNFs residing on additional NFVI (not shown) that are controlled by domain controller 199 (e.g., an SDN controller in on embodiment) via additional control links. However, at least a portion of the internal nodes 131-135 may comprise dedicated devices or components, e.g., non-SDN reconfigurable devices. The internal nodes 131-135 may originate with multiple (i.e., at least two) different vendors and may have different configurable parameters and features.

Similarly, network 105 may also include components 181 and 182, e.g., PE routers interfacing with network(s) 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs, PNFs, and/or CNFs hosted by and operating on additional NFVI. However, in another example, at least a portion of the components 181-185 may comprise dedicated devices or components.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, the domain controller 199 and/or other network elements may comprise functions that are spread across several devices that operate collectively as a the domain controller 199, a data distribution platform, a stream processing system, a data storage system, etc. Thus, these and other modifications of the system 100 are all contemplated within the scope of the present disclosure.

FIG. 2 illustrates a flowchart of an example method 200 for automatically configuring network elements in multi-vendor and multi-domain topologies, in accordance with the present disclosure. In particular, the method 200 provides a technique for training a machine learning model to predict network needs and configurations of network functions that will support the network needs in an optimal manner. In one example, the method 200 is performed by the domain controller 199 of FIG. 1, by any one or more components thereof (e.g., components 189-198), or by the domain controller 199 in conjunction with one or more other devices, such as one or more application servers, and so forth. In one example, the steps, functions, or operations of method 200 may be performed by a computing device or system 400, and/or processor 402 as described in connection with FIG. 4 below. For instance, the computing device or system 400 may represent any one or more components of a domain controller of the method 200. For illustrative purposes, the method 200 is described in greater detail below in connection with an example performed by a processing system.

The method 200 begins in step 202 and proceeds to step 204. In step 204, the processing system may discover the topology of a communications network, including a plurality of network functions from at least two different vendors.

In one example, the topology of the communications network may comprise the plurality of network functions, as well as a plurality of (wired and wireless) communication links connecting the plurality of network functions. In one example, the plurality of network functions may include virtual network functions (VNFs), physical network functions (PNFs), and cloud-native network functions (CNFs). The VNFs, PNFs, and CNFs may originate from at least two different vendors (i.e., manufacturers or sources). As such, different network functions of the plurality of network functions may have different features and different parameters that are configurable. Different network functions of the plurality of network functions may also utilize different proprietary data models and schema definitions.

In a further example, the communications network may further comprise at least two domains. For instance, each domain of the at least two domains may be associated with a different geographic location of an enterprise, a different department of an enterprise, or a different business function of an enterprise.

In step 206, the processing system may collect data from each network function of the plurality of network functions. In one example, the data is collected by selecting a route in the communications network, a source network function for the route, and a destination network function (e.g., next hop) for the route. For each of the source network function and the destination network function, settings are selected for a combination of configuration parameters. In one example, these configuration parameters may comprise at least one of: auto intent-based security policy and configuration parameter enforcement to the network functions, auto intent-based routing policy enforcement across layer 3 network functions, and auto intent-based quality of service (QOS) policy enforcement across network functions. In one example, different combinations of configuration parameter settings for each network function may be predefined, and step 206 may involve simply selecting one of the predefined combinations of configuration parameter settings.

In one example, for each route (i.e., each combination of source network function and destination network function), all possible predefined combinations of configuration parameter settings may be tested. Once all possible predefined combinations of configuration parameter settings for a route have been tested, a new route (with a new source network function and/or a new destination network function) is selected, and the process of testing all possible predefined combinations of configuration parameter settings is repeated for the new route. This may continue until all routes in the communications network have been tested and the data collected.

In step 208, the processing system may store the data that was collected in step 206. In one example, the data that was collected in step 206 may be stored in a database. The database may be continually updated as new data is collected from the communications network.

In step 210, the processing system may train a machine learning model, using the data that is collected, to predict a need of the communications network and respective configurations of the plurality of network functions that will support the need. In one example, the need of the communications network and/or the respective configurations of the plurality of network functions are learned using a machine learning model. The machine learning model may be trained using the data that was collected and stored in steps 206-208 as training data. In one example, the machine learning model may comprise a graph neural model (GNN), as the network topology is in the form of nodes (vertices) and links (edges). However, in other examples, the machine learning model may further utilize one or more of the following algorithms: logistic regression, support vector machines (SVMs), XGBoost, random forest, ensemble technique, convolutional neural networks (CNNs), artificial neural networks (ANNs), or the like.

In one example, the need of the communications network may comprise an expected trend in usage of or demand on the communications network (e.g., temporary drops and/or spikes in network traffic). For instance, the machine learning model may learn to detect when events that may cause a temporary surge in network traffic (e.g., large-scale sports events, elections, or the like) are approaching. In another example, the need of the communication network may comprise a more long term trend in usage of or demand on the communications network. For instance, the machine learning model may learn to detect when a network expansion (e.g., addition of new network functions) may be needed based on current rates of increase in network traffic.

The machine learning model may be further trained to take as input a predicted network need and to generate as an output a subset of the plurality of network functions and respective configurations (i.e., settings of configuration parameters) for the network functions in the subset. The subset and the associated configurations may represent the machine learning model's prediction as to the network configuration that will best support the network's need.

The method 200 may end in step 212. However, in one example, at least some steps of the method 200 may be repeated (for instance any time the topology of the communications network changes, such as to add a new network function or remove an existing network function). Furthermore, at least some steps of the method 200 may be repeated periodically (e.g., after predefined intervals of time have elapsed).

FIG. 3 illustrates a flowchart of an example method 300 for automatically configuring network elements in multi-vendor and multi-domain topologies, in accordance with the present disclosure. In particular, the method 300 provides a technique for predicting the optimal settings for a subset of network functions to support a known network need. In one example, the method 300 is performed by the domain controller 199 of FIG. 1, by any one or more components thereof (e.g., components 189-198), or by the domain controller 199 in conjunction with one or more other devices, such as one or more application servers, and so forth. In one example, the steps, functions, or operations of method 300 may be performed by a computing device or system 400, and/or processor 402 as described in connection with FIG. 4 below. For instance, the computing device or system 400 may represent any one or more components of a domain controller of the method 300. For illustrative purposes, the method 300 is described in greater detail below in connection with an example performed by a processing system.

The method 300 begins in step 302 and proceeds to step 304. In step 304, the processing system may determine a need of a communications network, where a topology of the communications network includes a plurality of network functions from at least two different vendors.

In one example, the topology of the communications network may comprise the plurality of network functions, as well as a plurality of (wired and wireless) communication links connecting the plurality of network functions. In one example, the plurality of network functions may include virtual network functions (VNFs), physical network functions (PNFs), and cloud-native network functions (CNFs). The VNFs, PNFs, and CNFs may originate from at least two different vendors (i.e., manufacturers or sources). As such, different network functions of the plurality of network functions may have different features and different parameters that are configurable. Different network functions of the plurality of network functions may also utilize different proprietary data models and schema definitions.

In a further example, the communications network may further comprise at least two domains. For instance, each domain of the at least two domains may be associated with a different geographic location of an enterprise, a different department of an enterprise, or a different business function of an enterprise.

In one example, the need of the communications network may be predicted by a machine learning model that is trained to predict network needs based on observations of current network conditions. For instance, the machine learning model may be trained to detect when and by how much network traffic is likely to increase or decrease (e.g., based on knowledge that a large scale sports event is approaching and knowledge of network conditions during past large scale sports events, an x percent increase in traffic is likely for the duration of the sports event and y days before and after the sports event). Thus, the machine learning model may take as input a current state of the network (and, potentially a state of the network going back by some predefined period of time, such as y days prior to the current day) and/or knowledge of upcoming events that may affect network demand. In one example, the machine learning model may comprise a generalized net model (GNM).

In another example, the need of the communications network may be specified by a human administrator. For instance, the human administrator may have knowledge of upcoming events that may affect the demand on the communications network.

In step 306, the processing system may predict a subset of the plurality of network functions and respective configuration parameter values for network functions in the subset, that are expected to support the need of the communications network. For instance, the machine learning model may be further trained (or a separate machine learning model may be separately trained) to take as an input the need of the communications network and to generate as an output the subset of the plurality of network functions and respective configurations (i.e., settings of configuration parameters) for the network functions in the subset. The subset and the associated configurations may represent the machine learning model's prediction as to the network configuration that will best support the network's need. Thus, it is assumed that the processing system has knowledge of the network topology (e.g., types of network functions, connections between network functions, vendors associated with network functions, configurable parameters of network functions, etc.).

In one example, the subset may include network functions that originate with at least two different vendors (e.g., at least a first network function originating with a first vendor and a second network function originating with a different, second vendor). Thus, the configuration profiles (i.e., the configuration parameters of the network functions that can be changed and the specific settings or values for the configuration patterns) may be different for at least two of the network functions (e.g., a first configuration profile for the first network function and a different, second configuration profile for the second network function).

In step 308, the processing system may modify the configurations of the network functions in the subset to reflect the respective configuration parameter values. For instance, having determined the optimal configuration parameter values for a first network function and a second network function, the processing system may take action to modify the configurations of the first network function and/or the second network function to bring the configurations in line with the respective configuration parameter values.

In one example, prior to modifying the configurations of the network functions in the subset, the processing system may estimate a monetary cost of the modifying and may present the estimated monetary cost (and, optionally, details of the modifications to be made) to a human administrator for review and approval. For instance, some modifications (e.g., modifications that involve addition of new network functions) may be relatively expensive to implement.

The processing system may also estimate an impact of the modifying on operation of the communications network. For instance, if the configuration parameters of a network function are to be modified, this may mean that the network function will not be operational (not be available to support needs of the communication network), or may be operational in a more limited capacity, while the configuration parameters are being modified. As with estimated costs, the estimated impact may be presented to a human administrator for review and approval prior to the modifying being performed.

In one example, if the human administrator does not approve the modifying, the processing system may schedule the modifying to be performed during a scheduled maintenance window for the communications network. For instance, there may be times when the communications network is expected to be temporarily not operational (or operational in a limited capacity) while scheduled maintenance tasks are being performed (e.g., software upgrades, addition of hardware, etc.).

The method 300 may end in step 310.

Although not expressly specified above, one or more steps of the methods 200 or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Thus, collectively, the methods 200 and 300 will optimize the configurations of network functions in a multi-vendor and/or multi-domain communications network topology. Machine learning may be used to learn the optimal runtime configurations (i.e., parameter settings and interface characteristics) for all network functions (VNFs, PNFs, and CNFs) within a multi-vendor and/or multi-domain network. A database of the network functions and their physical and virtual characteristics may be built and further analyzed to predict future resource needs of the network as well as devices and vendors that are compatible with those resource needs. Optimal runtime configurations may be applied automatically to the relevant network functions, potentially during scheduled maintenance windows to minimize disruptions. Thus, examples of the present disclosure simplify the configuration of multi-vendor and/or multi-domain network topologies FIG. 4 depicts a high-level block diagram of a computing device specifically programmed to perform the functions described herein. For example, any one or more components or devices illustrated in FIG. 1 or described in connection with the methods 200 and 300 may be implemented as the system 400. As depicted in FIG. 4, the system 400 comprises a hardware processor element 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for automatically configuring network elements in multi-vendor and multi-domain topologies, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, then the computing device of this Figure is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a specific purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 405 for automatically configuring network elements in multi-vendor and multi-domain topologies (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for automatically configuring network elements in multi-vendor and multi-domain topologies (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

determining, by a processing system including at least one processor, a predicted change in a network traffic demand on a communications network, wherein a topology of the communications network includes a plurality of network functions from at least two different vendors;

predicting, by the processing system, a subset of the plurality of network functions and respective configuration parameter values for network functions in the subset, that are expected to support the predicted change in the network traffic demand, wherein the predicting is performed using a machine learning model that is trained to take as an input the predicted change in the network traffic demand on the communications network and to generate as an output a prediction as to the subset of the plurality of network functions and the respective configuration parameter values for the network functions in the subset, and wherein training of the machine learning model comprises:

discovering, by the processing system, the topology of the communications network, including the plurality of network functions and a plurality of communication links between the plurality of network functions;

collecting, by the processing system, data from each network function of the plurality of network functions; and training, by the processing system, the machine learning model, using the data, to use the predicted change in the network traffic demand on the communications network to predict the respective configuration parameter values of the subset of the plurality of network functions that will support the predicted change in the network traffic demand; and modifying, by the processing system, configurations of the network functions in the subset to reflect the respective configuration parameter values.

2. The method of claim 1, wherein the plurality of network functions includes a plurality of virtual network functions, a plurality of physical network functions, and a plurality of cloud-native network functions.

3. The method of claim 1, wherein the plurality of network functions includes network functions having different features and different parameters that are configurable.

4. The method of claim 1, wherein the plurality of network functions includes network functions that utilize different proprietary data models and schema definitions.

5. The method of claim 1, wherein the communications network further includes at least two domains.

6. The method of claim 1, wherein the determining is also performed using the machine learning model.

7. The method of claim 1, wherein the machine learning model is a generalized net model.

8. The method of claim 1, wherein the discovering, the collecting, and the training are repeated in response to a change in the topology of the communications network.

9. The method of claim 1, wherein the data is stored in a database for use in identifying at least one trend in a usage of the communications network.

10. The method of claim 1, wherein the subset includes network functions that originate with at least two different vendors of the at least two different vendors.

11. The method of claim 1, wherein the processing system obtains an approval from a human administrator prior to the modifying.

12. The method of claim 11, wherein the processing system presents an estimated monetary cost of the modifying to the human administrator prior to obtaining the approval.

13. The method of claim 11, wherein the processing system presents an estimated impact of the modifying on operation of the communications network to the human administrator prior to obtaining the approval.

14. The method of claim 13, wherein the estimated impact of the modifying on operation of the communications network comprises a limitation on an operational capacity of the communications network while the modifying occurs.

15. The method of claim 1, wherein the modifying is performed during a scheduled maintenance window for the communications network.

16. A non-transitory computer-readable medium storing instructions which, when executed by a processing system including at least one processor, cause the processing system to perform operations, the operations comprising:

determining a predicted change in a network traffic demand on a communications network, wherein a topology of the communications network includes a plurality of network functions from at least two different vendors;

predicting a subset of the plurality of network functions and respective configuration parameter values for network functions in the subset, that are expected to support the predicted change in the network traffic demand, wherein the predicting is performed using a machine learning model that is trained to take as an input the predicted change in the network traffic demand on the communications network and to generate as an output a prediction as to the subset of the plurality of network functions and the respective configuration parameter values for the network functions in the subset, and wherein training of the machine learning model comprises:

discovering the topology of the communications network, including the plurality of network functions and a plurality of communication links between the plurality of network functions;

collecting data from each network function of the plurality of network functions; and training the machine learning model, using the data, to use the predicted change in the network traffic demand on the communications network to predict the respective configuration parameter values of the subset of the plurality of network functions that will support the predicted change in the network traffic demand; and modifying configurations of the network functions in the subset to reflect the respective configuration parameter values.

17. A system comprising:

a processing system including at least one processor; and a computer-readable medium storing instructions which, when executed by the processing system, cause the processing system to perform operations, the operations comprising:

determining a predicted change in a network traffic demand on a communications network, wherein a topology of the communications network includes a plurality of network functions from at least two different vendors;

predicting a subset of the plurality of network functions and respective configuration parameter values for network functions in the subset, that are expected to support the predicted change in the network traffic demand, wherein the predicting is performed using a machine learning model that is trained to take as an input the predicted change in the network traffic demand on the communications network and to generate as an output a prediction as to the subset of the plurality of network functions and the respective configuration parameter values for the network functions in the subset, and wherein training of the machine learning model comprises:

discovering the topology of the communications network, including the plurality of network functions and a plurality of communication links between the plurality of network functions;

collecting data from each network function of the plurality of network functions; and training the machine learning model, using the data, to use the predicted change in the network traffic demand on the communications network to predict the respective configuration parameter values of the subset of the plurality of network functions that will support the predicted change in the network traffic demand; and modifying configurations of the network functions in the subset to reflect the respective configuration parameter values.

18. The system of claim 17, wherein the plurality of network functions includes a plurality of virtual network functions, a plurality of physical network functions, and a plurality of cloud-native network functions.

19. The system of claim 17, wherein the plurality of network functions includes network functions having different features and different parameters that are configurable.

20. The system of claim 17, wherein the plurality of network functions includes network functions that utilize different proprietary data models and schema definitions.

\* \* \* \* \*